United States Patent
Tsai

(10) Patent No.: US 8,561,810 B2
(45) Date of Patent: Oct. 22, 2013

(54) FILTER CARTRIDGE WITH A POSITIONING CYLINDER FOR HOLDING FILTER ELEMENT IN PLACE

(76) Inventor: Fu-Chung Tsai, Taichung (TW)

( * ) Notice: Subject to any disclaimer, the term of this patent is extended or adjusted under 35 U.S.C. 154(b) by 193 days.

(21) Appl. No.: 13/098,789

(22) Filed: May 2, 2011

(65) Prior Publication Data

US 2012/0279914 A1    Nov. 8, 2012

(51) Int. Cl.
*B01D 35/00* (2006.01)
*B01D 35/28* (2006.01)
*B01D 29/13* (2006.01)

(52) U.S. Cl.
USPC ........... 210/455; 210/232; 210/435; 210/437; 210/440; 210/443; 210/457; 210/483; 210/484; 210/485; 210/541; 210/542; 428/36.9

(58) Field of Classification Search
None
See application file for complete search history.

(56) References Cited

U.S. PATENT DOCUMENTS

| | | | | |
|---|---|---|---|---|
| 2,600,150 A | * | 6/1952 | Abendroth | 166/228 |
| 2,658,625 A | * | 11/1953 | Rafferty | 210/445 |
| 3,486,626 A | * | 12/1969 | Close | 210/232 |
| 4,683,057 A | * | 7/1987 | Krause et al. | 210/232 |

FOREIGN PATENT DOCUMENTS

| | | |
|---|---|---|
| TW | 233510 | 11/1994 |
| TW | 497455 | 8/2002 |
| TW | M274158 | 9/2005 |
| TW | M317883 | 11/2007 |
| TW | M354453 | 4/2009 |
| TW | M393361 | 12/2010 |

* cited by examiner

*Primary Examiner* — Benjamin Kurtz
(74) *Attorney, Agent, or Firm* — Muncy, Geissler, Olds & Lowe, PLLC

(57) ABSTRACT

A filter cartridge includes a housing, a lid, a filter element and a positioning cylinder. The lid is provided for covering an opening of the housing. The filter element is disposed in the housing. The positioning cylinder together with the filter element is disposed in the housing and defining a passageway for reception of the filter element. Further, the positioning cylinder includes a plurality of bulging portions disposed about the passageway and each protruding toward a centerline axis of the passageway. The bulging portions of the positioning cylinder have their highest points equally spaced apart from the centerline axis of the passageway.

10 Claims, 4 Drawing Sheets

FILTER CARTRIDGE WITH A POSITIONING CYLINDER FOR HOLDING FILTER ELEMENT IN PLACE

BACKGROUND OF INVENTION

1. Field of Invention

The present invention relates to a filter cartridge for pretreatment of water in a water treatment system and pertains particularly to a filter cartridge with a positioning cylinder for holding a filter element in place.

2. Related Prior Art

As disclosed in Taiwan Patent No. M274158 or M393361A, a conventional water treatment system, such as a reverse osmosis (RO) water purifier, typically includes three filter cartridges standing in a line for pretreatment of water. The filter cartridges of the type to which this invention is directed can be found in Taiwan Patent No. 233510 or 497455.

FIG. 5 illustrates a filter cartridge for use in a conventional RO water purifier. The filter cartridge includes a lid 90, a filter element 91 and a housing 92. The lid 90 is affixed on a substrate 93 and has a support or stud 900 extending downwardly from a bottom thereof and an annular knife 901 surrounding the stud 900. In an opposite manner, the housing 92 has a support or stud 921 extending upwardly from a bottom thereof and an annular knife 921 surrounding the stud 900. The filter element 91 has a central bore 910 therein. The upper studs 900 and the lower stud 920 are opposed to each other and configured to penetrably engage opposite ends of the central bore 910 in the filter element 91. Once in a while, the filter element 91 may need to be replaced when it gets filthy. Steps to install a filter element 91 in the housing 91 are shown as follows:

Firstly, the filter element 91 is fed into the housing 92 with the lower stud 920 being received in one end of the central bore 910 of the filter element 91. Then, the housing 92 is rotated in a direction toward the lid 90. Once the housing 92 is rotated into a fully secured position onto the lid 90, the installation process of the filter element 91 is done.

Ideally, when the installation process is finished, the filter element 91 shall be located upright in the center of the housing 92. Further, the stud 900 of the lid 90 shall be inserted in the other end of the central bore 910 of the filter element 91, and the annular knife 901 will left an impress in the filter element 91 in a concentric manner with respect to the central bore 910 of the filter element 91.

Unfortunately, a gap typically exists in between the filter element 91 and the upper and/or lower studs 900, 920, and therefore the filter element 91 may slightly sway during the rotation of the housing 92 onto the lid 4 and may end up positioning itself in the housing 92 obliquely. That is, an impress may be left eccentrically in the filter element 91 by the annular knife 901. Even worse, the filter element 91 may be tilted at an angle, as shown in FIG. 5, or displaced to an eccentric position (not shown), where the annular knife 901 of the lid 90 presses against an edge of a top surface of the filter element 91 adjacent to the central bore 910. At this time, an impress A is eccentrically left in the filter element 91, as shown in FIG. 6. In this manner, the annular knife 901 cannot function well to separate untreated water which is outside the filter element 91 and treated water which is inside the filter element 91, and therefore there is no guarantee that the water coming out of the filter cartridge is clean. Additionally, this may cause the filter cartridge to have a reduced life span.

Other examples of filter cartridge are disclosed in Taiwan Patent Nos. M317883 and M354453, which provide some approaches to position a filter element within a housing. However, these approaches are specified and not applicable for a conventional cartridge housing.

Accordingly, it is desirable that a filter cartridge with filter element well position within a conventional cartridge housing be available therefor.

SUMMARY OF INVENTION

An object of the present invention is to provide a filter cartridge with a filter element properly positioned within a housing. Other objects and advantages of the invention are set out herein or are obvious herefrom to one skilled in the art.

The invention involves a filter cartridge for pretreatment of water in a water treatment system. The filter cartridge includes a housing, a lid, a filter element and a positioning cylinder. The lid is configured to cover an opening of the housing. The positioning cylinder is disposed in the housing and defining a passageway for reception of the filter element. Further, the positioning cylinder includes a plurality of bulging portions disposed about the passageway and each protruding toward a centerline axis of the passageway. The bulging portions have their highest points equally spaced apart from the centerline axis of the passageway. In this manner, those bulging portions of the positioning cylinder hold the filter element in place and have the filter element sit upright within the housing without sloping or swaying.

Specifically, the positioning cylinder includes two rings and a plurality of ribs. The two rings are coaxial and spaced a distance apart from each other. Each of the ribs has one end joined to one of the rings and the other end joined to the other ring. The ribs are arranged about the centerline axis of the passageway and equally spaced apart from one another so as to co-define the passageway therebetween. And, each of the ribs has the aforementioned bulging portion protruding toward the centerline axis of the passageway. Preferably, each of the ribs is a flexible arch-shaped strip to ensure that any sizes of filter element can be firmly positioned in place. In other words, the positioning cylinder itself can be applied for a conventional cartridge case.

Further features and advantages of the present invention will be appreciated by review of the following detailed description of the invention.

BRIEF DESCRIPTION OF DRAWINGS

The invention is illustrated by the accompanying drawings in which corresponding parts are identified by the same numerals and in which.

DETAILED DESCRIPTION OF EMBODIMENTS

Figure 1:
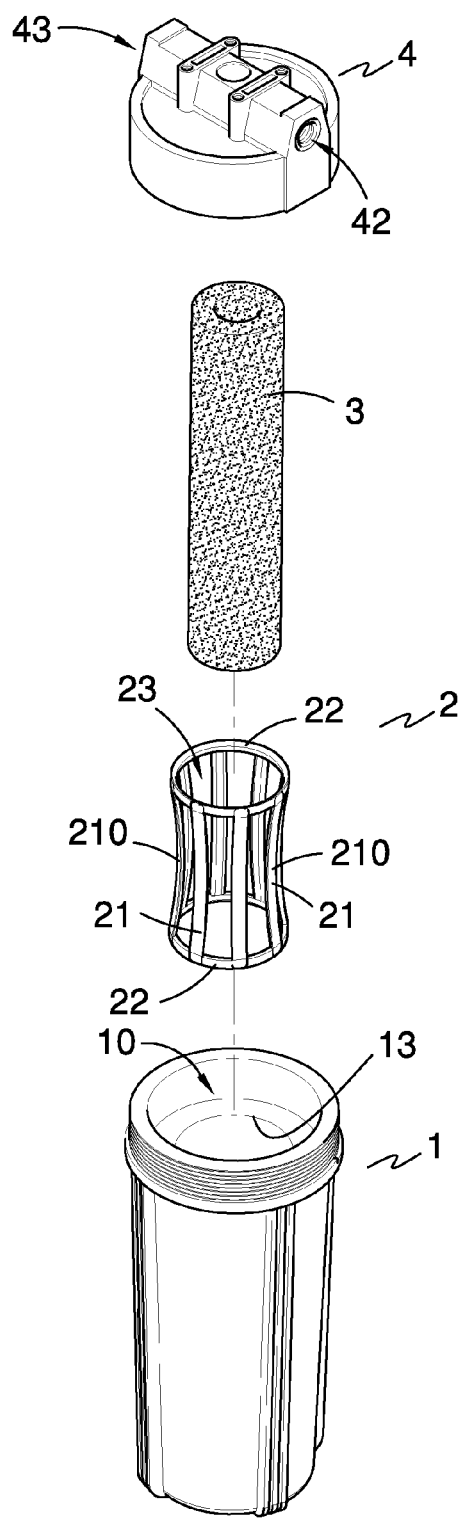
FIG. 1 is an exploded view of a filter cartridge in accordance with the preferred embodiment of the invention.

With reference to FIGS. 1-4, there is shown an illustration of a filter cartridge in accordance with one embodiment the present invention. The filter cartridge includes a housing 1, a positioning cylinder 2, a filter element 3 and a lid 4. In general, the positioning cylinder 2 and the filter element 3 are disposed in the housing 1, and the lid 4 covers a top opening 10 of the housing 1.

Figure 3:
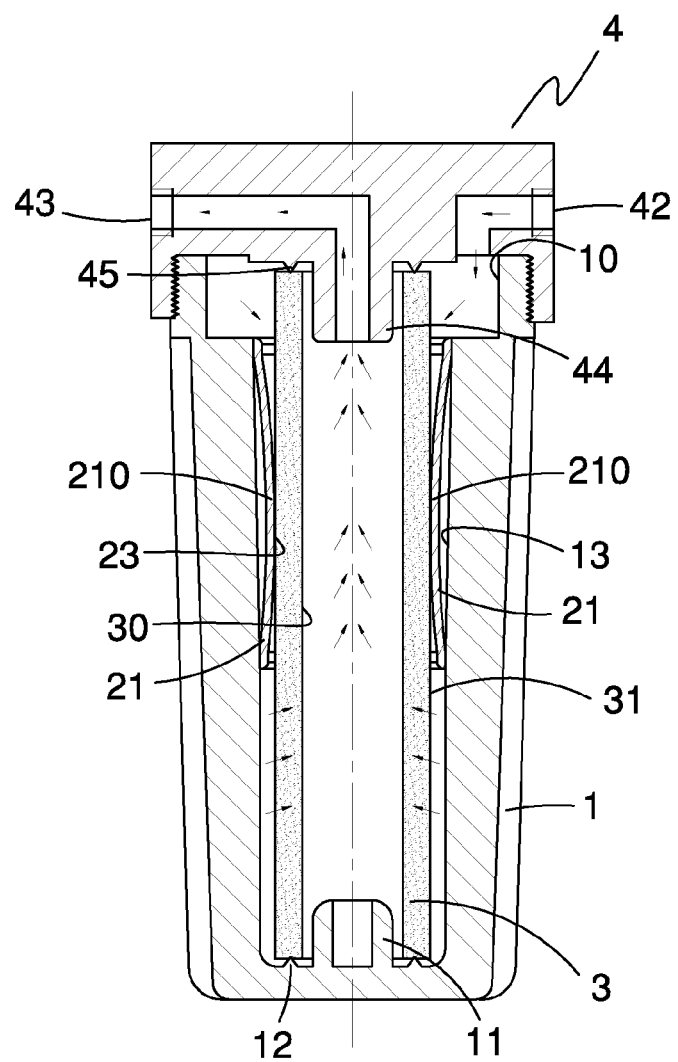
FIG. 3 is a cross section of the filter cartridge of FIG. 1.
Figure 6:
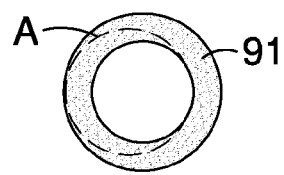
FIG. 6 is a perspective view of a filter element with an impress A formed therein when the filter element is obliquely located within a housing, as depicted in FIG. 5.
Figure 5:
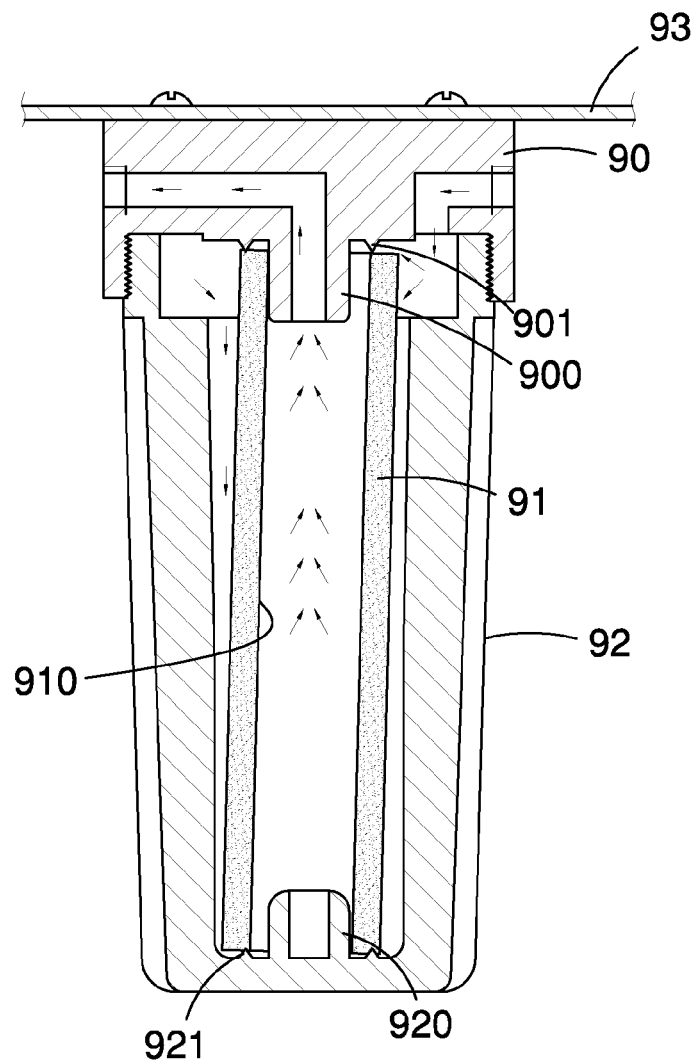
FIG. 5 is a cross section of a prior art filter cartridge.

Referring now to FIG. 1 of the drawings, the positioning cylinder 2 includes a plurality of ribs 21 arranged in a circle and two rings 22 for tying upper and lower ends of the ribs 21 together. Specifically, the two rings 22 are coaxial and spaced a distance apart from each other. That is, each of the ribs 21 has one end joined to one ring 22 and the other end joined to the other ring 22. The ribs 21 are arranged along peripheral edges of the rings 22 and equally spaced apart from one another so as to co-define a passageway 23 therebetween for reception of the filter element 3. Further, each of the ribs 21 has a bulging portion 210 protruding toward a centerline axis of the passageway 23. As shown in FIGS. 1 and 3, the bulging portions 210 have their highest points equally spaced a distance apart from the centerline axis of the passageway 23. Preferably, each of the ribs 21 is a flexible arch-shaped strip.

Figure 2:
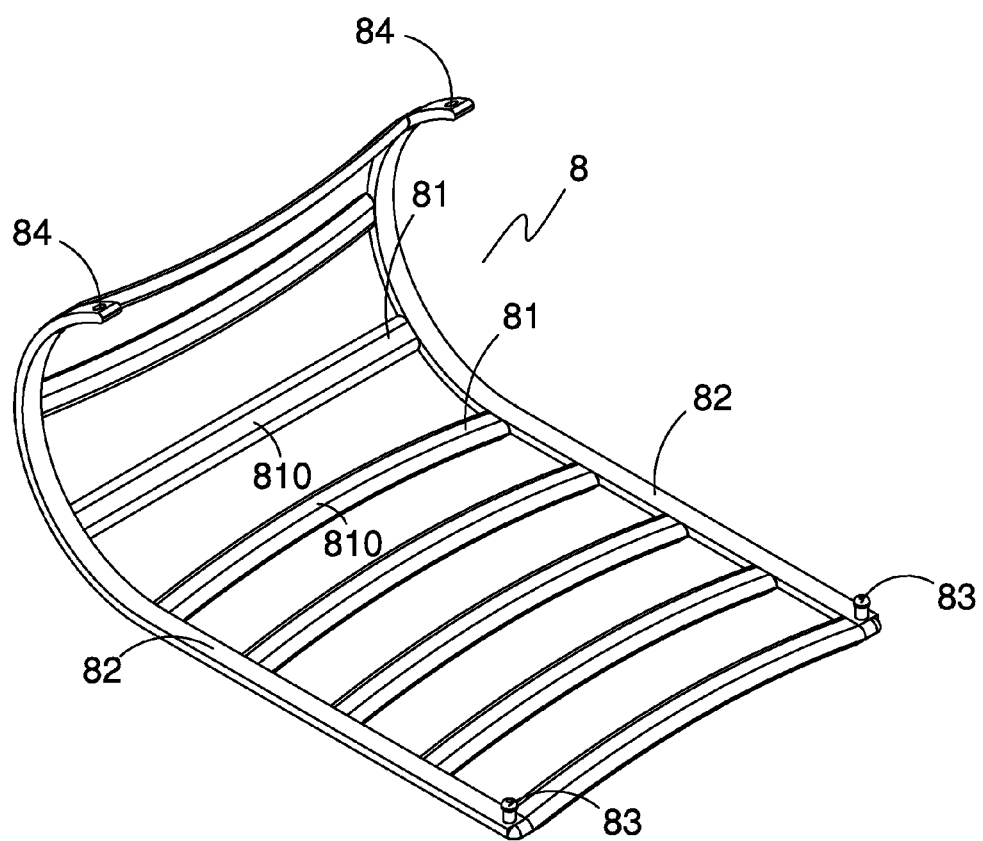
FIG. 2 is a perspective view of a positioning sheet to be rolled up in a cylindrical form and serving as a positioning cylinder for use in the filter cartridge.

The positioning cylinder 2 may be integrally formed in one piece or be formed from a positioning sheet 8 (FIG. 2) being rolled up in a cylindrical form. As shown in FIG. 2, the positioning sheet 8 includes a sheet body containing a plurality of ribs 81 and two strips 82. The sheet body has a front surface and a back surface opposite to the front surface. The two strips 82 of the sheet body are parallel to each other and have the same length. Each of the strips 82 is bendable and has a male fastener 83 and a female fastener 84 at opposite ends to be fastened with each other. The ribs 81 of the sheet body are equally spaced apart from one another and have the same length. Each of the ribs 81 has one end joined to one strip 82 and the other end joined to the other strip 82. Further, each of the ribs 81 of the sheet body has a bulging portion 810. When the positioning sheet 8 is unrolled or spread out flat on a table, the bulging portion 810 extends the same height toward the same direction. Once the opposite ends of each of the two strips 82 are fastened with each other, the positioning sheet 8 has been rolled up like the positioning cylinder 2 of FIG. 1, for reception of the filter element 3. The positioning sheet 8 is relatively smaller and therefore easy to carry and storage.

Referring to FIG. 3, the housing 1 has a support or stud 11 upwardly extending from a bottom thereof and an annular knife 12 surrounding the stud 11. On the contrary, the lid 4 has a support or stud 44 downwardly extending from a bottom thereof and an annular knife 45 surrounding the stud 44. The two studs 11, 44 are opposed to each other to be received in opposite end openings of a central bore 30 of the filter element 3, and whereby guide the filter element 3 to the center of the housing 92. In addition, the lid 4 has an inlet 42 and an outlet 43 through which water may enter into and escape the filter cartridge respectively.

Figure 4:
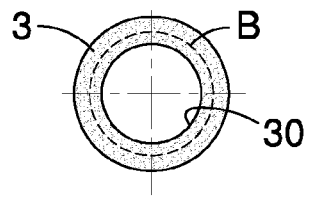
FIG. 4 is a perspective view of a filter element with an impress B formed therein when the filter element is properly held by the positioning cylinder within a housing, as depicted in FIG. 3.

Furthermore, the positioning cylinder 2 is sandwiched between an outer wall 31 of the filter element 3 and an inner wall 13 of the housing 1. In this manner, the bulging portions 210 of the positioning cylinder 2 together hold the filter element 3 in place. As shown in FIG. 3, the annular knife 45 of the lid 4 suppress on top of the filter element 3 and leave an impress B, as depicted in FIG. 4, which is concentric with the central bore 30 of the filter element 3. The impress B clearly indicates that the filter element 3 sits upright at the center of the housing 1 without sloping or swaying.

Preferably, each of the ribs 21 is a flexible arch-shaped strip. Since the bulging portions 210 of the ribs 21 are flexible, the positioning cylinder 2 can accommodates high tolerance of outside diameter of filter element. In other words, the positioning cylinder itself can be applied for a conventional cartridge case or housing 1 and ensure the filter element 3 be firmly held within the cartridge case.

It will be appreciated that although a particular embodiment of the invention has been shown and described, modifications may be made. It is intended in the claims to cover such modifications which come within the spirit and scope of the invention.

The invention claimed is:

1. A positioning sheet to be rolled up in cylindrical form for being disposed between a filter element and a housing, the positioning sheet comprising:
   a rollable sheet, having two elongated flat edges extending in a longitudinal direction of the rollable sheet and a supporting surface between the two elongated flat edges, the rollable sheet capable of being rolled up along the longitudinal direction thereof, thereby forming a cylinder enclosing a passageway for the reception of the filter element passing through; and
   a plurality of bulging portions vertically protruding from the supporting surface of the rollable sheet toward the same direction, bulging portions co-defining a horizontal level higher than a horizontal level of the elongated flat edges of the rollable sheet;
   wherein when the rollable sheet is rolled up into the form of the cylinder with the supporting surface facing inward, the cylinder has a first diameter at an inlet of the cylinder and a second diameter at a location of the cylinder wherein the bulging portions is, and the first diameter is greater than the second diameter, such that the filter element is allowed to pass through the passageway of the cylinder from the inlet of the cylinder and the bulging portions are against the filter element.

2. The positioning sheet of claim 1, wherein the rollable sheet consists of two rollable elongated strips extending in the longitudinal direction of the rollable sheet and parallel to each other and a plurality of ribs located between the two rollable elongated strips along the longitudinal direction; each of the ribs equally spaced apart from one another; each of the rollable elongated strips being capable of being rolled up along a longitudinal direction; and each of the ribs having one end joined to one of the rollable elongated strips and the other end joined to the other rollable elongated strip.

3. The positioning sheet of claim 2, wherein each of the ribs is a flexible arch-shaped strip.

4. The positioning sheet of claim 2, wherein each of the rollable elongated strips has opposite ends to be fastened with each other.

5. The positioning sheet of claim 4, wherein each of the rollable elongated strips is formed with a male fastener and a female fastener at the opposite ends.

6. The positioning sheet of claim 2, wherein the bulging portions protrudes from the ribs and the bulging portions spaces apart from each other along a directions parallel to the longitudinal direction.

7. The positioning sheet of claim 6, wherein the bulging portions are integrally formed in one piece with the ribs.

8. The positioning sheet of claim 2, wherein the ribs are integrally formed in one piece with the rollable elongated strips.

9. The positioning sheet of claim 1, wherein the bulging portions against the filter element extend the same height.

10. The positioning sheet of claim 1, wherein the bulging portions are integrally formed in one piece with the rollable sheet.

* * * * *